United States Patent
Zhang et al.

(10) Patent No.: US 12,138,575 B2
(45) Date of Patent: Nov. 12, 2024

(54) PYROLYSIS BIO-OIL FRACTIONAL CONDENSATION DEVICE AND METHOD CAPABLE OF COOLING MEDIUM SELF-CIRCULATION

(71) Applicant: SOUTHEAST UNIVERSITY, Nanjing (CN)

(72) Inventors: Huiyan Zhang, Nanjing (CN); Shuping Zhang, Nanjing (CN); Bo Peng, Nanjing (CN); Rui Xiao, Nanjing (CN)

(73) Assignee: SOUTHEAST UNIVERSITY, Nanjing (CN)

(*) Notice: Subject to any disclaimer, the term of this patent is extended or adjusted under 35 U.S.C. 154(b) by 201 days.

(21) Appl. No.: 18/012,098

(22) PCT Filed: Dec. 20, 2021

(86) PCT No.: PCT/CN2021/139449
§ 371 (c)(1),
(2) Date: Dec. 21, 2022

(87) PCT Pub. No.: WO2022/257412
PCT Pub. Date: Dec. 15, 2022

(65) Prior Publication Data
US 2023/0256356 A1    Aug. 17, 2023

(30) Foreign Application Priority Data
Jun. 7, 2021  (CN) .......................... 202110634144.2

(51) Int. Cl.
*B01D 5/00* (2006.01)
*C10B 53/00* (2006.01)
*C10G 1/00* (2006.01)

(52) U.S. Cl.
CPC ......... *B01D 5/0027* (2013.01); *B01D 5/0036* (2013.01); *B01D 5/0057* (2013.01); *B01D 5/0087* (2013.01); *B01D 2202/00* (2013.01)

(58) Field of Classification Search
CPC .. B01D 5/0027; B01D 5/0036; B01D 5/0057; B01D 5/0087; B01D 2202/00;
(Continued)

(56) References Cited

U.S. PATENT DOCUMENTS

| | | | |
|---|---|---|---|
| 8,476,480 B1 | 7/2013 | Brown et al. | |
| 2014/0352204 A1* | 12/2014 | Belanger | C10C 5/00 422/187 |
| 2019/0292467 A1 | 9/2019 | England | |

FOREIGN PATENT DOCUMENTS

| | | |
|---|---|---|
| CN | 101624531 A | 1/2010 |
| CN | 101851520 A | 10/2010 |

(Continued)

*Primary Examiner* — Randy Boyer
*Assistant Examiner* — Juan C Valencia
(74) *Attorney, Agent, or Firm* — MUNCY, GEISSLER, OLDS & LOWE, P.C.

(57) ABSTRACT

The present disclosure relates to a pyrolysis bio-oil fractional condensation device and method capable of cooling medium self-circulation. The device includes a primary condensation system, a secondary condensation system and a cooling medium self-regulation heat exchange system. The primary condensation system uses the temperature-regulated cooling medium to condense the macromolecular tar by direct heat exchange with the pyrolysis volatiles. The condensed tar is heated, pushed and scraped with a rotary mechanism to prevent adhesion. The spray liquid in the secondary condensation system exchange heat with the uncondensed volatiles directly for secondary condensation. The cooling medium self-regulation heat exchange system realizes self-circulation and self-balance of the cooling medium mass flow and energy flow by integrating heat (Continued)

absorption during biomass raw material feeding and drying, heat release during volatiles condensation, and heat absorption during pyrolysis char cooling, and realized the independent operation of the condensation device in the mobile biomass pyrolysis system.

10 Claims, 2 Drawing Sheets

(58) Field of Classification Search
CPC ..... B01D 5/0096; Y02E 50/10; Y02P 20/145; C10B 53/00; C10G 1/002
See application file for complete search history.

(56) References Cited

FOREIGN PATENT DOCUMENTS

| | | |
|---|---|---|
| CN | 103031139 A | 4/2013 |
| CN | 104673340 A | 6/2015 |
| CN | 108102673 A | 6/2018 |
| CN | 109504468 A | 3/2019 |
| CN | 113384913 A | 9/2021 |
| CN | 215137028 U | 12/2021 |

* cited by examiner

PYROLYSIS BIO-OIL FRACTIONAL CONDENSATION DEVICE AND METHOD CAPABLE OF COOLING MEDIUM SELF-CIRCULATION

TECHNICAL FIELD

The present disclosure relates to the technical field of biomass pyrolysis and condensation, in particular to a pyrolysis bio-oil fractional condensation device and method capable of cooling medium self-circulation.

BACKGROUND

Preparation of bio-oil by biomass pyrolysis and liquefaction is an important form of biomass energy utilization and is also a technical route of biomass-based engineering that is simple in process and easy to scale up. The system equipment of biomass pyrolysis is mainly divided into four parts: (1) a raw material feeding device; (2) a pyrolysis reactor; (3) a bio-oil condensation and collection device; and (4) a biochar condensation and collection device. The bio-oil condensation and collection device is related to the yield and components of the target product bio-oil, and its structure has a great influence on the basic characteristics of bio-oil (including water content, viscosity, corrosivity, calorific value, etc.). Fractional condensation is a process of separating bio-oil into two or more bio-oil products with different components and stable properties by online separation based on the difference in boiling points of various components of the bio-oil, such as macromolecular tar and wood vinegar, both of which have good prospects for industrial application. Tar can be used as a raw material for preparing high-quality activated carbon or carbon black, and wood vinegar is a green and organic agricultural fertilizer.

At present, the bio-oil fractional condensation device mainly adopts multi-stage spray direct condensation or shell-and-pipe indirect condensation in series, which is also a technical means that is easy to implement. The applicant found that in the low-temperature condensation section, both the spray direct condensation and the shell-and-pipe indirect condensation are mature and simple in mechanism and industrialized promotion. However, the difficulty of the fractional condensation technique lies in the condensation of the product tar in the high-temperature section. Tar is mainly composed of macromolecular oligomers, which have the characteristics of high viscosity and easy adhesion to the wall. If spray direct condensation is used, the tar is not easily conveyed and atomized due to its poor fluidity. If the shell-and-pipe indirect condensation is used, the tar may easily adhere to the wall and block the heat exchanger channel due to its high viscosity, and an adhesion layer is formed on the wall surface of the heat exchange pipe, which greatly reduces the heat exchange efficiency. Therefore, it is extremely important to develop a novel device for fractional condensation of pyrolysis bio-oil and collection of tar and wood vinegar.

In addition, the mobile biomass pyrolysis and liquefaction system is one of the mainstream trends at present, which essentially requires the whole pyrolysis system including the feed device, the pyrolysis reactor and the condensation and char collection device to be placed on one mobile source, thus putting forward new requirements for the condensation device of bio-oil. The condensation device of a centralized biomass pyrolysis system generally uses water as a cold source or cooling medium, but this solution is not suitable for a mobile biomass pyrolysis and liquefaction system.

SUMMARY

In view of the defects in the prior art, the present disclosure provides a pyrolysis bio-oil fractional condensation device and method capable of cooling medium self-circulation, which realizes the independent operation of the condensation device of the mobile biomass pyrolysis system.

The technical solution of the present disclosure is as follows:

Provided is a pyrolysis bio-oil fractional condensation device capable of cooling medium self-circulation, including a primary condensation system, a secondary condensation system and a cooling medium temperature self-regulation heat exchange system.

The primary condensation system structurally includes a tar condensation device with a direct heat exchange structure, so that high-temperature pyrolysis volatile matters are condensed into tar after directly exchanging heat with the cooling medium. The secondary condensation system structurally includes a spray chamber with a direct heat exchange structure, so that uncondensed volatile matters after the primary condensation undergo secondary condensation by directly exchanging heat with a spray liquid.

The cooling medium temperature self-regulation heat exchange system structurally includes a temperature regulation mixer and a plurality of heat exchanger. A heat exchanger I uses a part of the cooling medium heated by the primary condensation system as a heat source for drying a biomass raw material, a heat exchanger II uses the cooling medium cooled by the heat exchanger I as a cold source for cooling the spray liquid, and a heat exchanger III uses the other part of the cooling medium heated by the primary condensation system as a cold source for cooling pyrolysis char generated during pyrolysis. At the same time, the two streams of cooling medium heated by the heat exchanger II and the heat exchanger III are respectively introduced into the temperature regulation mixer and mixed, and then supplied to the tar condensation device, thereby forming a circulation loop.

The further technical solution is as follows:

The tar condensation device structurally includes a hollow jacket pipe provided with a hollow rotating shaft therein. A cavity for the volatile matters to flow is formed between the hollow rotating shaft and the hollow jacket pipe. Two ends of the hollow jacket pipe are respectively provided with a pipe side inlet and a pipe side outlet communicating with the cavity. An axial cavity is formed in the hollow rotating shaft, and two ends of the hollow rotating shaft are respectively provided with a shaft side inlet and a shaft side outlet.

The temperature regulation mixer is provided with a high-temperature inlet, a low-temperature inlet and a medium-temperature outlet. The medium-temperature outlet is respectively connected to the pipe side inlet and the shaft side inlet through parallel pipes. The pipe side outlet and the shaft side outlet are connected in parallel and then respectively connected to medium side inlets of the heat exchanger I and the heat exchanger III through a three-way valve. A medium side outlet of the heat exchanger I is connected to a medium side inlet of the heat exchanger II, a medium side outlet of the heat exchanger III is connected to the high-temperature inlet, and the low-temperature inlet is connected to a medium side outlet of the heat exchanger II.

The hollow rotating shaft is provided with a plurality of sets of blades along an axial direction. Each set of the blades are distributed along a circumference. A tip of each blade is connected with a scraper, and the scraper abuts against an inner wall of the hollow jacket pipe.

The blade has a hollow structure in which a radial cavity is formed, and the radial cavity communicates with the axial cavity.

A gas inlet of the spray chamber is provided with a flow divider for equalizing gas flow, which structurally includes a louvered flow equalizing plate, and the louvered flow equalizing plate includes a plurality of vanes uniformly and symmetrically distributed along circumferential and height directions. An inflow pipe is connected upstream to the louvered flow equalizing plate, and the inflow pipe is connected to a gas outlet of the tar condensation device.

The heat exchanger II is a shell-and-pipe heat exchange structure whose shell is provided with a spray liquid inlet and a spray liquid outlet, the spray liquid inlet is connected to a through pipe at a bottom of the spray chamber, and the spray liquid outlet is connected to a spray head at a top of the spray chamber through a pipe.

The heat exchanger III is a shell-and-pipe heat exchange structure whose shell is provided with a gaseous pyrolysis char inlet and a liquid pyrolysis char outlet. The heat exchanger I is a shell-and-pipe heat exchanger whose shell is provided with a conveying mechanism therein for conveying the biomass raw material.

The hollow jacket pipe is provided with a volatile matter inlet and a tar collecting box.

Provided is a method of the pyrolysis bio-oil fractional condensation device capable of cooling medium self-circulation, including a cooling medium self-circulation process and a volatile matter two-stage condensation process.

The two-stage condensation process is as follows:

The primary condensation system uses the temperature-regulated cooling medium to directly exchange heat with the pyrolysis volatile matters so as to condense the macromolecular tar, and heats the condensed tar and pushes and scrapes the tar with a rotary mechanism so as to prevent the tar from adhesion.

The secondary condensation system uses the spray liquid to directly exchange heat with the uncondensed volatile matter after the primary condensation so as to realize further condensation.

The cooling medium self-circulation process is as follows:

a part of the cooling medium heated after the primary condensation process is used as the cold source for cooling the pyrolysis char, and then the cooling medium is further used as the cold source for cooling the spray liquid so as to realize circulating utilization. The other part is used as a heat source for drying and heating the biomass raw material, and the two streams of cooling medium after cooling the spray liquid and heating the biomass raw material are mixed to form the temperature-regulated cooling medium for the primary condensation, thereby forming the circulation, where a temperature of the spray liquid for cooling the uncondensed volatile matters is 20-50° C.;

a temperature of the cooling medium after heat exchange with the spray liquid is 50-100° C.;

a temperature of the cooling medium after heat exchange with the biomass raw material is 300-350° C.; and a temperature of the temperature-regulated cooling medium is 150-220° C.

The present disclosure has the following beneficial effects:

(1) According to the present disclosure, self-circulation and self-balance of the mass flow and energy flow of the cooling medium are realized by integrating three parts of heat exchange: heat absorption during the biomass raw material feeding and drying process, heat release during condensation of volatile matters, and heat absorption during cooling of pyrolysis char, and the independent operation of the condensation device of the mobile biomass pyrolysis system is realized.

(2) According to the present disclosure, under the heat preservation action of the hollow jacket pipe, the hollow rotating shaft and the blades and the self-cleaning action of the scrapers, the tar condensation device can effectively cool and collect macromolecular tar while ensuring that the tar does not adhere to the wall.

(3) According to the present disclosure, the flow divider of the spray chamber with a flow divider has a unique square-frustum louvered structure, which can prevent water in the spray chamber from flowing into the flow divider and make volatile gases uniformly distributed on the cross section of the spray chamber.

In the figures: 1, volatile matter inlet; 2, tar condensation device; 3, hollow jacket pipe; 4, hollow rotating shaft; 5, tar collecting box; 6, flow divider; 7, spray chamber; 8, demister; 9, pyrolysis gas outlet pipe; 10, through pipe; 11, heat exchanger II; 12, wood vinegar heat exchange coil; 13, spray head; 14, cooling medium inlet; 15, cooling medium outlet; 16, temperature regulation mixer; 17, low-temperature inlet; 18, high-temperature inlet; 19, medium-temperature outlet; 20, shaft side inlet; 21, pipe side inlet; 22, pipe side outlet; 23, shaft side outlet; 24, three-way valve; 25, heat exchanger I; 26, heat exchanger III; 27, axial cavity; 28, radial cavity; 29, scraper; 30, louvered flow equalizing plate; 31, rib plate; 32, blade; 33, inflow pipe.

DETAILED DESCRIPTION

Specific implementations of the present disclosure are described below with reference to the accompanying drawings.

Figure 1:
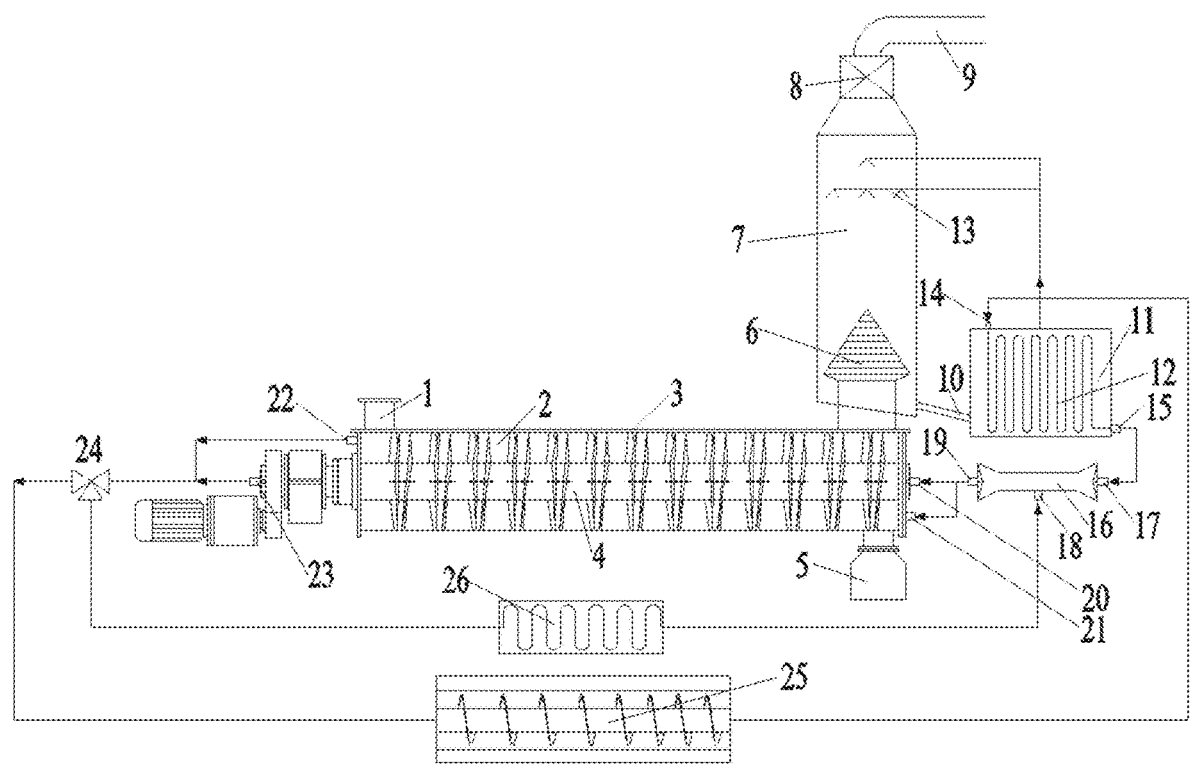
FIG. 1 is a schematic structural diagram of a condensation device according to the present disclosure.

As shown in FIG. 1, a pyrolysis bio-oil fractional condensation device capable of cooling medium self-circulation of this embodiment includes a primary condensation system, a secondary condensation system and a cooling medium temperature self-regulation heat exchange system.

The primary condensation system structurally includes a tar condensation device 2 with a direct heat exchange structure, so that high-temperature pyrolysis volatile matters are condensed into tar after directly exchanging heat with the cooling medium. The secondary condensation system structurally includes a spray chamber 7 with a direct heat exchange structure, so that uncondensed volatile matters after the primary condensation undergo secondary condensation by directly exchanging heat with a spray liquid.

The cooling medium temperature self-regulation heat exchange system structurally includes a temperature regulation mixer 16 and a plurality of heat exchanger. A heat exchanger I 25 uses a part of the cooling medium heated by the primary condensation system as a heat source for drying a biomass raw material, a heat exchanger II 11 uses the cooling medium cooled by the heat exchanger I 25 as a cold source for cooling the spray liquid, and a heat exchanger III 26 uses the other part of the cooling medium heated by the primary condensation system as a cold source for cooling pyrolysis char generated during pyrolysis. At the same time, the two streams of cooling medium heated by the heat exchanger II 11 and the heat exchanger III 26 are respectively introduced into the temperature regulation mixer 16 and mixed, and then supplied to the tar condensation device 2, thereby forming a circulation loop.

Figure 2:
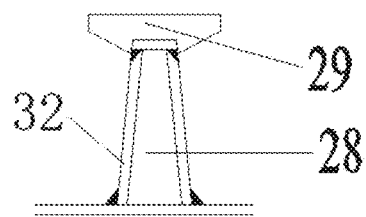
FIG. 2 is a schematic diagram of a mounting structure of a hollow rotating shaft, a blade and a scraper of the condensation device according to the present disclosure.
Figure 2:
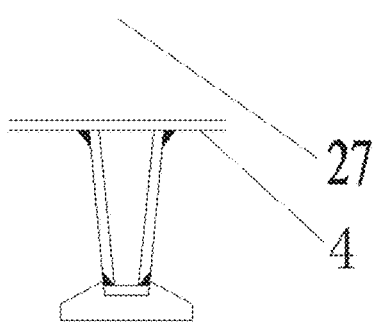

In the above embodiment, the tar condensation device 2 structurally includes a hollow jacket pipe 3 provided with a hollow rotating shaft 4 therein. A cavity for the volatile matters to flow is formed between the hollow rotating shaft 4 and the hollow jacket pipe 3. Two ends of the hollow jacket pipe 3 are respectively provided with a pipe side inlet 21 and a pipe side outlet 22 communicating with the cavity. As shown in FIG. 2, an axial cavity 27 is formed in the hollow rotating shaft 4, and two ends of the hollow rotating shaft are respectively provided with a shaft side inlet 20 and a shaft side outlet 23.

Specifically, the volatile matters flow in the cavity, and the cooling medium is also introduced into the cavity, so that the volatile matters directly exchanges heat with the cooling medium, which makes the macromolecular tar in the volatile matters cooled and condensed.

The cooling medium is also introduced into the axial cavity 27 to provide heat preservation conditions for the tar, which prevents the tar from becoming cool and adhering to the hollow jacket pipe 3 or shaft.

In the above embodiment, the temperature regulation mixer 16 is provided with a high-temperature inlet 18, a low-temperature inlet 17 and a medium-temperature outlet 19. The medium-temperature outlet 19 is respectively connected to the pipe side inlet 21 and the shaft side inlet 20 through parallel pipes. The pipe side outlet 22 and the shaft side outlet 23 are connected in parallel and then respectively connected to medium side (cooling medium) inlets of the heat exchanger I 25 and the heat exchanger III 26 through a three-way valve 24. A medium side (cooling medium) outlet of the heat exchanger I 25 is connected to a medium side (cooling medium) inlet of the heat exchanger II 11, a medium side (cooling medium) outlet of the heat exchanger III 26 is connected to the high-temperature inlet 18, and the low-temperature inlet 17 is connected to a medium side (cooling medium) outlet of the heat exchanger II 11.

In the above embodiment, the hollow jacket pipe 3 is provided with a volatile matter inlet 1 and a tar collecting box 5 which communicate with an internal cavity of the hollow jacket pipe.

In order to improve the fluidity of the tar, as shown in FIG. 2, the hollow rotating shaft 4 is provided with a plurality of sets of blades 32 along an axial direction. Each set of the blades 32 are distributed along a circumference. A tip of each blade 32 is connected with a scraper 29, and the scraper 29 abuts against an inner wall of the hollow jacket pipe 3. The volatile matters flow in from the volatile matter inlet 1, flows through gaps between the vanes along the axial direction, and are condensed by exchanging heat with the cooling medium. The hollow rotating shaft 4 is driven to rotate by a drive device, the blades 32 rotate with the hollow rotating shaft to push the condensed tar to flow, and the tar finally flows into the tar collecting box 5. At the same time, the scrapers 29 scrapes off the tar that may adhere to the inner wall of the hollow jacket pipe 3 to prevent the tar from adhesion.

Preferably, as shown in FIG. 2, each set of blades 32 includes two blades, each blade deflects a certain angle tangentially to the hollow rotating shaft 4, and the two blades are symmetrically arranged on the hollow rotating shaft 4.

Preferably, a longitudinal section of the blade 32 has a trapezoidal structure.

Preferably, the scraper 29 has a sheet structure that extends a certain length in the axial direction to improve the scraping effect.

In order to increase the heat exchange area and improve the heat preservation performance so as to further improve the fluidity of the tar, the blade 32 has a hollow structure in which a radial cavity 28 is formed, and the radial cavity 28 communicates with the axial cavity 27. Specifically, the radial cavity 28 may communicate with the axial cavity 27 through small through holes provided in the hollow rotating shaft 4, so that the cooling medium flows from the axial cavity 27 into the radial cavity 28 during the rotation of the hollow rotating shaft 4, thereby increasing the heat exchange area and satisfying the heat preservation demand for the condensed tar.

A hollow interlayer is formed in the wall of the hollow jacket pipe 3 to improve the heat insulation from the external environment, thereby improving the heat preservation performance of the tar condensation device 2.

Preferably, the tar with high viscosity is pushed forward by the blade 32 with the scraper 29 into the tar collecting box 5 under the heat preservation action of the hollow jacket pipe 3, the hollow rotating shaft 4 and the blades 32.

Figure 3:
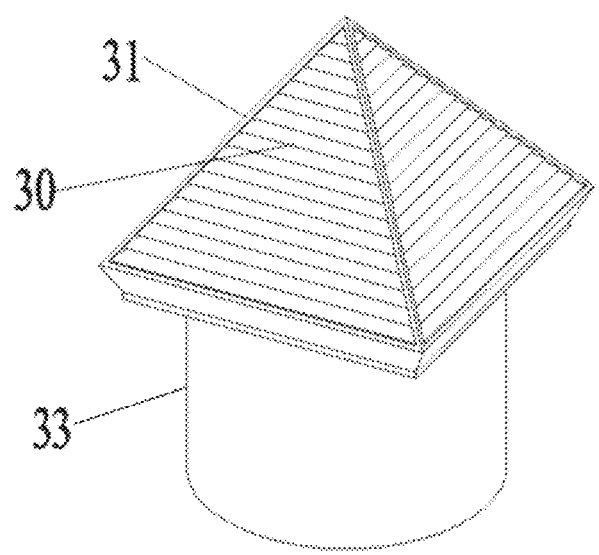
FIG. 3 is a structural diagram of a flow divider of the condensation device according to the present disclosure.

In the above embodiment, in order to increase the gas flow uniformity and further improve the secondary condensation effect, a gas inlet of the spray chamber 7 is provided with a flow divider 6 for equalizing gas flow, which structurally includes a louvered flow equalizing plate 30. As shown in FIG. 3, the louvered flow equalizing plate 30 includes a plurality of vanes uniformly and symmetrically distributed along circumferential and height directions. An inflow pipe 33 is connected upstream to the louvered flow equalizing plate 30, and the inflow pipe 33 is connected to a gas outlet of the tar condensation device 2.

As a specific implementation, the louvered flow equalizing plate 30 may have a rectangular pyramid structure whose four sides are respectively provided with vanes sequentially arranged along the height direction, and every two adjacent sides are reinforced and fixed through a rib plate 31.

Specifically, the inflow pipe 33 is parallel to an inflow direction of the gas flow, and the louvered flow equalizing plate 30 is perpendicular to the inflow pipe 33. The vanes of the louver form a certain angle with the spray direction of the spray liquid to prevent the spray liquid from flowing into the flow divider 6.

As a specific implementation, as shown in FIG. 1, the heat exchanger II 11 is a shell-and-pipe heat exchange structure whose shell is provided with a spray liquid inlet and a spray liquid outlet, the spray liquid inlet is connected to a through pipe 10 at a bottom of the spray chamber 7, and the spray liquid outlet is connected to a spray head 13 at a top of the spray chamber 7 through a pipe.

Specifically, the spray liquid is wood vinegar, and a medium side channel of the heat exchanger II 11 is a wood vinegar heat exchange coil 12 whose two ends are respectively provided with a cooling medium inlet 14 and a cooling medium outlet 15.

Specifically, the top of the spray chamber 7 is provided with a demister 8 whose outlet is connected with a pyrolysis gas outlet pipe 9. The uncondensed volatile matters from the tar condensation device 2 flow out from its gas outlet into the spray chamber 7 through the flow divider 6, and cooled by the spray liquid to undergo secondary condensation. At the same time, the water-soluble wood vinegar is collected and sent into the wood vinegar heat exchange coil 12 of the heat exchanger II 11 through the through pipe 10 below the spray chamber 7, exchanges heat with the cooling medium, and then is conveyed from the top of the heat exchanger II 11 to the spray head 13 through a pipe, thereby realizing the circulating spray.

As a specific implementation, as shown in FIG. 1, the heat exchanger III 26 is a shell-and-pipe heat exchange structure whose shell is provided with a gaseous pyrolysis char inlet and a liquid pyrolysis char outlet (not shown). The pyrolysis char is a substance generated in during the biomass pyrolysis process.

As a specific implementation, the heat exchanger I 25 is a shell-and-pipe heat exchanger whose shell is provided with a conveying mechanism therein for conveying the biomass raw material. The cooling medium is used for heating and drying the biomass raw material, which saves the energy consumption for preheating before pyrolysis.

Specifically, the conveying mechanism is a spiral feeding machine, and the cooling medium runs in the pipe, thereby realizing indirect heat exchange with the spiral feeding machine.

A method of the pyrolysis bio-oil fractional condensation device capable of cooling medium self-circulation of this embodiment includes a cooling medium self-circulation process and a volatile matter two-stage condensation process.

The two-stage condensation process is as follows:

The primary condensation system uses the temperature-regulated cooling medium to directly exchange heat with the pyrolysis volatile matters so as to condense the macromolecular tar, and heats the condensed tar and pushes and scrapes the tar with a rotary mechanism so as to prevent the tar from adhesion.

The secondary condensation system uses the spray liquid to directly exchange heat with the uncondensed volatile matter after the primary condensation so as to realize further condensation.

The cooling medium self-circulation process is as follows:

A part of the cooling medium heated after the primary condensation process is used as the cold source for cooling the pyrolysis char, and then the cooling medium is further used as the cold source for cooling the spray liquid so as to realize circulating utilization. The other part is used as a heat source for drying and heating the biomass raw material, and the two streams of cooling medium after cooling the spray liquid and heating the biomass raw material are mixed to form the temperature-regulated cooling medium for the primary condensation, thereby forming the circulation.

A temperature of the spray liquid for cooling the uncondensed volatile matters is 20-50° C.

A temperature of the cooling medium after heat exchange with the spray liquid is 50-100° C.

A temperature of the cooling medium after heat exchange with the biomass raw material is 300-350° C.

A temperature of the temperature-regulated cooling medium is 150-220° C.

The specific processes are as follows:

The volatile matter condensation process includes: The volatile matters entering from the pyrolysis volatile matter inlet 1 of the tar condensation device 2 are cooled by the temperature-regulated cooling medium (with a temperature of 150-220° C.), such that the macromolecular tar is condensed and its viscosity increases, and the tar is pushed forward by the blade 32 with the scraper 29 into the tar collecting box 5 under the heat preservation action of the hollow jacket pipe 3, the hollow rotating shaft 4 and the blades 32. The uncondensed volatile matters directly flow out from the outlet into the louvered flow divider 6 of the spray-type heat exchange and condensation wood vinegar system. Under the action of the louvered flow equalizing plate 30, the volatile matter gas flow is uniformly distributed on the cross section of the whole spray chamber 7, and undergoes secondary condensation by directly exchanging heat with the wood vinegar (with the temperature of 20-50° C.) sprayed through the spray head 13. The water-soluble wood vinegar is collected and sent into the shell of the heat exchanger II 11 through the through pipe 10. The water-soluble wood vinegar is cooled by exchanging heat with the cooling medium in the wood vinegar heat exchange coil 12, and then is sprayed through the spray head 13 to cool the pyrolysis volatile matters. The cooled pyrolysis gas flow passes through the demister 8 such that the aerosol is removed, and then, the pyrolysis gas flow flows out through the pyrolysis gas outlet pipe 9.

The cooling medium circulation process includes: A part of the cooling medium in the tar condensation device 2 flows in from the pipe side inlet 21 to directly exchange heat with the pyrolysis volatile matters at the high-temperature section, and flows out via the pipe side outlet 22, and the other part flows into the hollow rotating shaft 4 through the shaft side inlet 20, flows out through the shaft side outlet 23, and flows into the three-way valve 24. A part of the cooling medium in the three-way valve is used through the heat exchanger III 26 as the cold source for cooling the pyrolysis char during pyrolysis, and the heated cooling medium enters the temperature regulation mixer 16 from the high-temperature inlet 18. At this time, the temperature of this part of the cooling medium reaches 300-350° C. The other part is used through the heat exchanger I 25 as the heat source for drying the biomass raw material. After drying the raw material, the cooled cooling medium enters the wood vinegar heat exchange coil 12 of the heat exchanger II 11 through the cooling medium inlet 14 to serve as the cold source of the wood vinegar. The cooling medium is heated after heat exchange, and flows through the cooling medium outlet 15 into the temperature regulation mixer 16 via the low-temperature inlet 17. At this time, the temperature of this part of the cooling medium reaches 50-100° C. The two steams of the cooling medium with high and low temperatures are mixed in the temperature regulation mixer 16. The temperature-regulated cooling medium with a temperature of 150-220° C. flows through the medium-temperature outlet 19, and is respectively fed into the shaft side inlet 20 and the pipe side inlet 21 through the pipes connected in parallel to serve as the cold source for condensing the macromolecular tar and the heat-preservation medium in the tar condensation device 2.

The cooling medium is water, etc.

The pyrolysis bio-oil fractional condensation device and method capable of cooling medium self-circulation according to the present disclosure realizes the independent operation of the condensation device of the mobile biomass pyrolysis system. By using the primary and secondary (high temperature and low temperature) condensation systems, self-circulation and self-balance of the mass flow and energy flow of the cooling medium are realized by integrating three parts of heat exchange: heat absorption during the biomass raw material feeding and drying process, heat release during condensation of volatile matters, and heat absorption during cooling of pyrolysis char, thereby achieving the purpose of multi-stage energy utilization.

The foregoing descriptions are exemplary implementations of the present disclosure. It is noted that a person of ordinary skill in the art may make some improvements and modifications without departing from the principle of the present disclosure and the improvements and modifications shall fall within the protection scope of the present disclosure.

What is claimed is:

1. A pyrolysis bio-oil fractional condensation device capable of cooling medium self-circulation, comprising a primary condensation system, a secondary condensation system and a cooling medium temperature self-regulation heat exchange system; wherein
the primary condensation system structurally comprises a tar condensation device with a direct heat exchange structure, so that high-temperature pyrolysis volatile matters are condensed into tar after directly exchanging heat with the cooling medium; the secondary condensation system structurally comprises a spray chamber with a direct heat exchange structure, so that uncondensed volatile matters after the primary condensation undergo secondary condensation by directly exchanging heat with a spray liquid;
the cooling medium temperature self-regulation heat exchange system structurally comprises a temperature regulation mixer and a plurality of heat exchanger; a heat exchanger I uses a part of the cooling medium heated by the primary condensation system as a heat source for drying a biomass raw material, a heat exchanger II uses the cooling medium cooled by the heat exchanger I as a cold source for cooling the spray liquid, and a heat exchanger III uses the other part of the cooling medium heated by the primary condensation system as a cold source for cooling pyrolysis char generated during pyrolysis; and at the same time, the two streams of cooling medium heated by the heat exchanger II and the heat exchanger III are respectively introduced into the temperature regulation mixer and mixed, and then supplied to the tar condensation device, thereby forming a circulation loop.

2. The pyrolysis bio-oil fractional condensation device capable of cooling medium self-circulation according to claim 1, wherein the tar condensation device structurally comprises a hollow jacket pipe provided with a hollow rotating shaft therein, a cavity for the volatile matters to flow is formed between the hollow rotating shaft and the hollow jacket pipe, two ends of the hollow jacket pipe are respectively provided with a pipe side inlet and a pipe side outlet communicating with the cavity, an axial cavity is formed in the hollow rotating shaft, and two ends of the hollow rotating shaft are respectively provided with a shaft side inlet and a shaft side outlet.

3. The pyrolysis bio-oil fractional condensation device capable of cooling medium self-circulation according to claim 2, wherein the temperature regulation mixer is provided with a high-temperature inlet, a low-temperature inlet and a medium-temperature outlet; and the medium-temperature outlet is respectively connected to the pipe side inlet and the shaft side inlet through parallel pipes, the pipe side outlet and the shaft side outlet are connected in parallel and then respectively connected to medium side inlets of the heat exchanger I and the heat exchanger III through a three-way valve, a medium side outlet of the heat exchanger I is connected to a medium side inlet of the heat exchanger II, a medium side outlet of the heat exchanger III is connected to the high-temperature inlet, and the low-temperature inlet is connected to a medium side outlet of the heat exchanger II.

4. The pyrolysis bio-oil fractional condensation device capable of cooling medium self-circulation according to claim 3, wherein the hollow rotating shaft is provided with a plurality of sets of blades along an axial direction, each set of the blades are distributed along a circumference, a tip of each blade is connected with a scraper, and the scraper abuts against an inner wall of the hollow jacket pipe.

5. The pyrolysis bio-oil fractional condensation device capable of cooling medium self-circulation according to claim 4, wherein the blade has a hollow structure in which a radial cavity is formed, and the radial cavity communicates with the axial cavity.

6. The pyrolysis bio-oil fractional condensation device capable of cooling medium self-circulation according to claim 3, wherein a gas inlet of the spray chamber is provided with a flow divider for equalizing gas flow, which structurally comprises a louvered flow equalizing plate, and the louvered flow equalizing plate comprises a plurality of vanes uniformly and symmetrically distributed along circumferential and height directions; and an inflow pipe is connected upstream to the louvered flow equalizing plate, and the inflow pipe is connected to a gas outlet of the tar condensation device.

7. The pyrolysis bio-oil fractional condensation device capable of cooling medium self-circulation according to claim 3, wherein the heat exchanger II is a shell-and-pipe heat exchange structure whose shell is provided with a spray liquid inlet and a spray liquid outlet, the spray liquid inlet is connected to a through pipe at a bottom of the spray chamber, and the spray liquid outlet is connected to a spray head at a top of the spray chamber through a pipe.

8. The pyrolysis bio-oil fractional condensation device capable of cooling medium self-circulation according to claim 3, wherein the heat exchanger III is a shell-and-pipe heat exchange structure whose shell is provided with a gaseous pyrolysis char inlet and a liquid pyrolysis char outlet; and the heat exchanger I is a shell-and-pipe heat exchanger whose shell is provided with a conveying mechanism therein for conveying the biomass raw material.

9. The pyrolysis bio-oil fractional condensation device capable of cooling medium self-circulation according to claim 2, wherein the hollow jacket pipe is provided with a volatile matter inlet and a tar collecting box.

10. A method of the pyrolysis bio-oil fractional condensation device capable of cooling medium self-circulation according to claim 1, comprising a cooling medium self-circulation process and a volatile matter two-stage condensation process; wherein
the two-stage condensation process is as follows:
the primary condensation system uses the temperature-regulated cooling medium to directly exchange heat with the pyrolysis volatile matters so as to condense the macromolecular tar, and heats the condensed tar and pushes and scrapes the tar with a rotary mechanism so as to prevent the tar from adhesion; the secondary condensation system uses the spray liquid to directly exchange heat with the uncondensed volatile matter after the primary condensation so as to realize further condensation;

the cooling medium self-circulation process is as follows:

a part of the cooling medium heated after the primary condensation process is used as the cold source for cooling the pyrolysis char, and then the cooling medium is further used as the cold source for cooling the spray liquid so as to realize circulating utilization; the other part is used as a heat source for drying and heating the biomass raw material, and the two streams of cooling medium after cooling the spray liquid and heating the biomass raw material are mixed to form the temperature-regulated cooling medium for the primary condensation, thereby forming the circulation, wherein a temperature of the spray liquid for cooling the uncondensed volatile matters is 20-50° C.;

a temperature of the cooling medium after heat exchange with the spray liquid is 50-100° C.;

a temperature of the cooling medium after heat exchange with the biomass raw material is 300-350° C.; and a temperature of the temperature-regulated cooling medium is 150-220° C.

* * * * *